United States Patent [19]

Gregorio

[11] Patent Number: 5,084,781

[45] Date of Patent: Jan. 28, 1992

[54] UNIVERSAL STEREOSCOPIC VIEWER BASED ON A NEW PRINCIPLE OF OPTICAL CONVERGENCY

[75] Inventor: Pietrangelo Gregorio, Naples, Italy

[73] Assignee: Stereovision International S.R.L., Napoli, Italy

[21] Appl. No.: 504,582

[22] Filed: Apr. 4, 1990

[30] Foreign Application Priority Data

Apr. 7, 1989 [IT] Italy ................. 20043 A/89

[51] Int. Cl.$^5$ ............................................ G02B 27/22
[52] U.S. Cl. .................................... 359/466; 359/473
[58] Field of Search ............... 350/130, 131, 133, 139; 359/466, 473

[56] References Cited

U.S. PATENT DOCUMENTS 2,063,989 12/1936 DuMond ..................... 350/133
3,418,035 12/1968 Rau ............................. 350/139

FOREIGN PATENT DOCUMENTS 411670 6/1910 France ........................ 350/133

*Primary Examiner*—Scott J. Sugarman
*Attorney, Agent, or Firm*—Notaro & Michalos

[57] ABSTRACT

This invention relates to a universal stereoscopic viewer that by means of modifying the current lens-slide distance used up to the present, affords any user a sharp, clear three-dimensional vision of a pair of images.

4 Claims, 3 Drawing Sheets

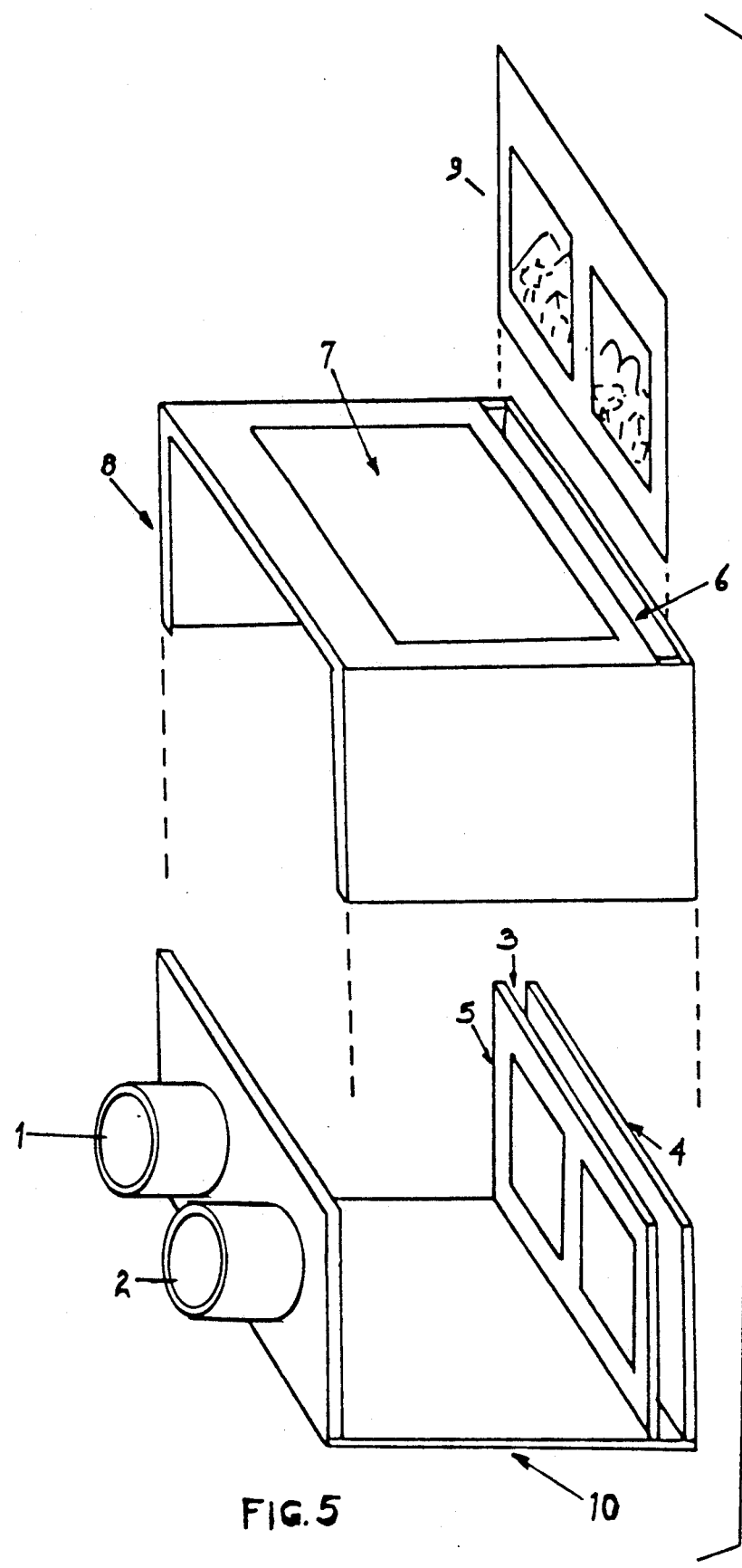

UNIVERSAL STEREOSCOPIC VIEWER BASED ON A NEW PRINCIPLE OF OPTICAL CONVERGENCY

FIELD AND BACKGROUND OF THE INVENTION

This invention proposes a universal stereoscopic viewer that by means of modifying the current lens-slide distance used up to the present, affords any user a sharp, clear three-dimensional vision of a pair of images. Up to the present, a great deal of equipment has been made which makes it possible to obtain a three-dimensional vision using an appropriate pair of two-dimensional images especially the kind that use a pair of slides. All such equipment is constructed to obey the following relationships:

$$D = F \text{ and}$$

$$A = B$$

where

D represents the distance between the slides and the lenses,

F is the focal distance of the lenses through which the images must be viewed,

A is the distance between the optic axes of these lenses and

B is the distance between the centers of these images.

This stereoscopic equipment is non-universal for various reasons. First of all, the two lenses are always at a distance of 63–65 mm., a distance which is considered to be the average distance of the interpupillary distances of the users (children have an interpupillary distance of 55 mm., macrocephalous people: an interpupillary distance of 85 mm.) have in addition, since the images are also 63–65 mm. far from each other and at the same distance as the focal distance of the lenses, the combinations are virtually endless.

Now, according to some surveys done by the inventor of this device, whenever a person looks at an object, his or her eyes, depending on the distance between him or her and the object, automatically converge at a certain angle and the crystalline lens contracts in order to focus the object in question; these two movements of convergency and focusing are very much tied together and dependent upon each other. Also, it has been shown that when a person looks at a moving object at a distance greater than 10 meter, normally he or she tends to turn his or her head rather than move his or her eyes (the typical movement of spectators at a tennis match) whereas for smaller distances, the person tends to move his or her eyes rather than his or her head. We can deduce that at a certain distance, the eyes acquire a certain inertia or "laziness".

Considering the above observations, the user who looks into one of the stereoscopic devices that are on today's market, finds that he or she is looking at two images virtually at infinity that nevertheless, contain three dimensional details that are much closer (3–5 meter); thus the user must make a preliminary effort to disassociate the ocular convergency movement from the focusing movement.

Secondly, in order to look at the various details in the two images, he or she must make another effort to overcome the inertia or "laziness" of his or her own eyes in viewing different objects but which are all practically without end.

In addition, the users who have an interpupillary distance which is less then the considered average (63–65 mm.) are, indeed, required to diverge their eyes which is very difficult to do since it is absolutely unnatural.

These problems in perceiving a correct three dimensional vision frequently lead to a general and sudden fatigue of the user's entire visual apparatus and often cause trouble such as headaches, a feeling of nausea or dizziness.

According to recent statistics, because of these side effects, only 9% of the users are able to perceive a correct vision of the three-dimensional effect in these devices without experiencing the above-mentioned manifestations.

Furthermore, there is stereoscopic equipment with variable adjustment that, however, besides being more complicated and expensive, requires delicate calibrations depending on the interpupillary distance of the user.

SUMMARY OF THE INVENTION

In order to avoid the problems mentioned, this invention proposes a universal stereoscopic viewer based on the following rules:

1) the distance between the centers of the images must not exceed 55 mm. approximately, since this distance is considered the minimum interpupillary distance of the user.

2) If this distance is called D, the distance X between the optic axes of the lenses through which the user sees these images must be:

$$D < X < D + 1/6 \, D$$

3) To overcome the inertia or laziness of eyes that observe objects at a distance greater than 10 meter, the images must be placed at a distance from the lenses which is less that the focal distance of the lenses themselves, in particular, they must be at a virtual distance of 6–8 meter.

4) Since common convergent lenses permit a clear vision only at their central part which has a diameter equal to ⅔ of the distance of the lens, the lenses used must have a diameter that permits a correct vision to all users no matter what interpupillary distance he or she may have (from 55 mm. in children to 80–85 mm. in macrocephalous people).

BRIEF DESCRIPTION OF THE DRAWINGS

At this point, a description will be given of a version of this invention according to a preferential realization using the attached drawings where:

FIG. 5 is an exploded perspective drawing of the newly invented viewer.

DESCRIPTION OF THE PREFERRED EMBODIMENT

Figure 2:
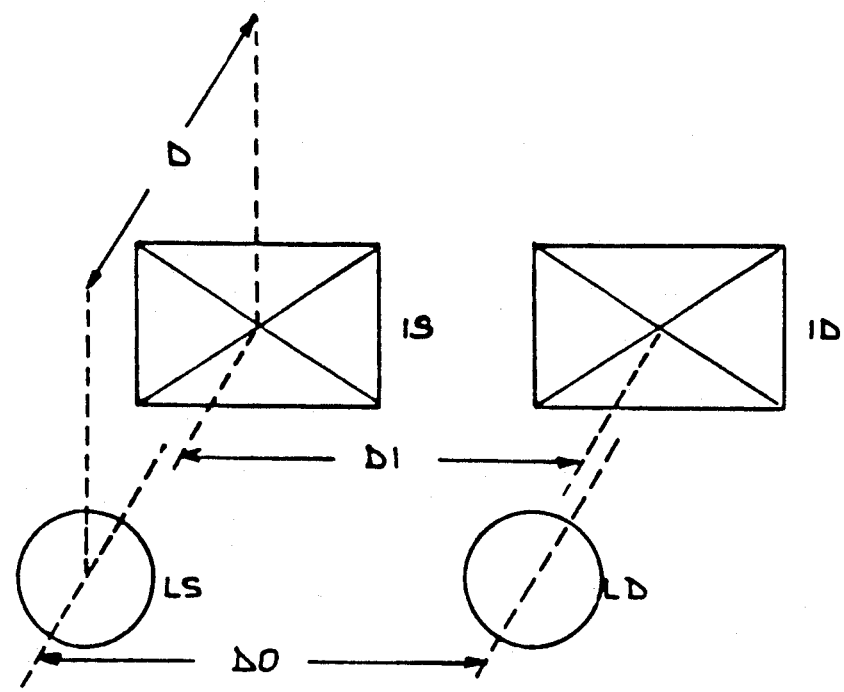
FIG. 2 is a drawing of the lens-image position according to the newly invented viewer.
Figure 1:
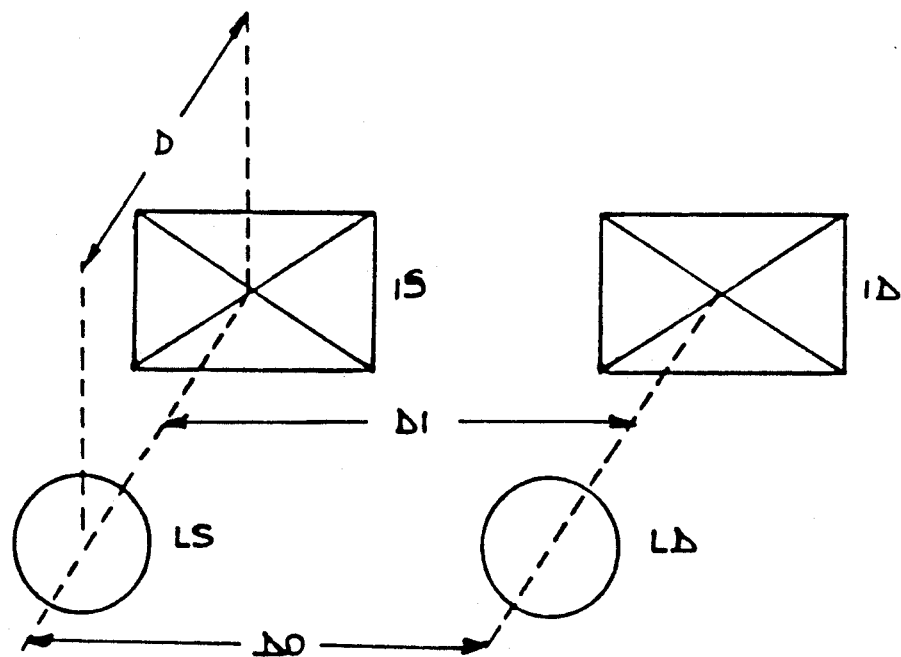
FIG. 1 is a drawing of the lens-image position using one of the viewers based on preceding techniques.
Figure 4:
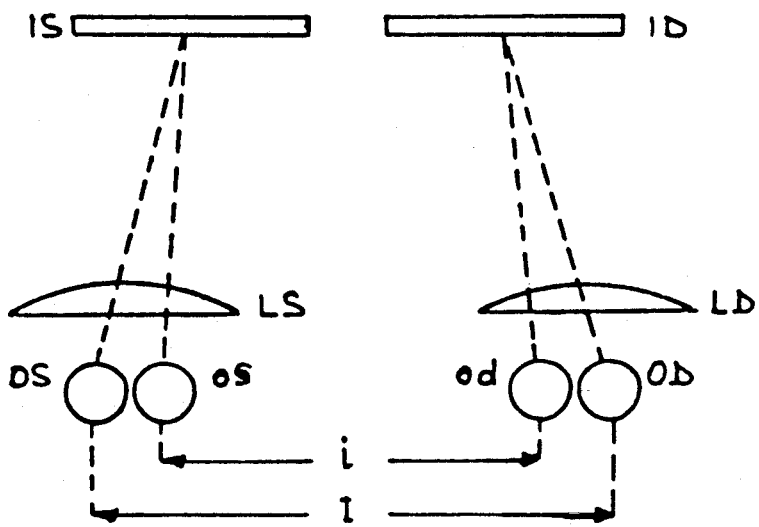
FIG. 4 is a drawing of the eye-lens-image position according to the newly invented viewer which is the subject of this application.
Figure 3:
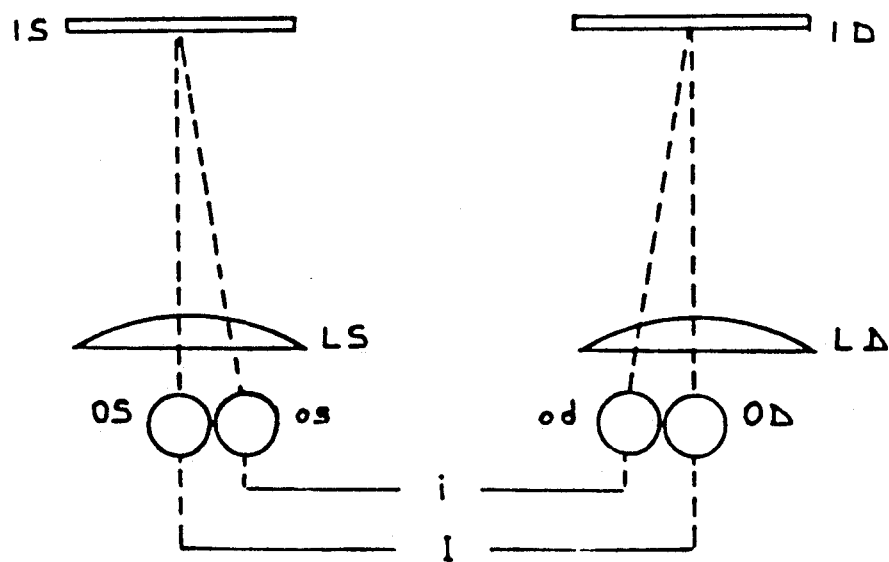
FIG. 3 is a drawing of the eye-lens-image position with regard to one of the preceding viewers.

As we can easily see by quickly comparing FIGS. 3 and 4, whereas with the traditional viewers, the images are virtually endless and the users with a less than average interpupillary distance were required to converge their eyes (an absolutely unnatural position), instead, using the newly invented viewer, when the user's interpupillary distance varies, only the degree of convergency of the eyes will vary, thus making the eyes themselves adopt a position which is perfectly natural and comfortable. In FIG. 5, we can see how this viewer is constructed. The invention has in particular, a base 10 with a front wall including two ocular pieces, 1 and 2, which contain the lenses or groups of lens placed on the front portion of this base and forming viewing means. The base has a back wall portion 4 made of a translucent material which diffuses the light evenly inside the viewer itself.

A wall 5 that has two square sections, forms with wall 4, an interspace or mounting means 3, (for holding the pair of images) in which there are guides and pressure pieces for positioning and keeping the pair of images in place (not shown).

A cover 8 includes a section 7 on top, made of translucent material for illuminating evenly the pair of images whenever these images are printed on paper and are not slides.

This cover 8 also has a slit 6 for the insertion of the pair of images whether they are independent of or a part of frame 9.

I claim:

1. A universal stereoscopic viewer, comprising mounting means for supporting a pair of images with centers of the images being at most 55 mm apart so that the distance between the centers of the pair of images is shorter than the smallest interpupillary distance of a user, and viewing means positioned at a spaced location from said mounting means for permitting a user to simultaneously view the images, said viewing means comprising a pair of lens means each having an optical axis extending toward a respective one of the images, the optical axes of said lens means being spaced from each other by a distance X following the relationship: $D<X<D+(1/6)D$, where D is the distance between the centers of the images.

2. A viewer according to claim 1, wherein each lens means has a focal distance, said mounting means being spaced from said viewing means by less than the focal distance of the lens means so that the images have a virtual distance of only up to 10 meters.

3. A viewer according to claim 2, wherein the virtual distance is from 6 to 8 meters.

4. A universal stereoscopic viewer, comprising mounting means for supporting a pair of images with centers of the images being at most 55 mm apart so that the distance between the centers of the pair of images is shorter than the smallest interpupillary distance of a user, and viewing means positioned at a spaced location from said mounting means for permitting a user to simultaneously view the images, said viewing means comprising a pair of lens means spaced from the mounting means, each lens means having a diameter which is sufficiently large so that despite the interpupillary distance for a user, a user always views the images through a central part of each lens means which is ⅔ the total diameter for each lens means.

* * * * *